United States Patent [19]

Bowen et al.

[11] Patent Number: 5,777,880
[45] Date of Patent: Jul. 7, 1998

[54] METHOD AND APPARATUS FOR CORRECTIVELY GUIDING A CUTTING DEVICE ON A PREDETERMINED PATH ALONG A SHEET MATERIAL

[75] Inventors: Dale Thomas Bowen, Timberlake; Timothy Gladstone Clapp, New Hill; Douglas Martin Pendergraph, Jr., Bahama; Frank Warren Taylor, II, Cary, all of N.C.

[73] Assignee: Albani Bayeux, Inc., Henderson, N.C.

[21] Appl. No.: 604,174

[22] Filed: Feb. 21, 1996

[51] Int. Cl.⁶ .............................. G06F 19/00; G06K 9/00; B23Q 15/22
[52] U.S. Cl. .................. 364/470.14; 364/470.05; 364/470.06; 112/470.06; 382/111; 83/74
[58] Field of Search ............... 364/470.05, 470.06, 364/470.14; 112/470.01, 470.06; 382/111; 83/74, 56

[56] References Cited

U.S. PATENT DOCUMENTS

| | | |
|---|---|---|
| 3,768,488 | 10/1973 | Hasslinger .................. 219/121.72 |
| 4,154,530 | 5/1979 | Connolly, Jr. et al. ........... 356/139.05 |
| 4,833,957 | 5/1989 | Lundgren ........................... 83/56 |
| 5,172,326 | 12/1992 | Campbell, Jr. et al. ........... 364/470.05 |
| 5,204,913 | 4/1993 | Morooka et al. ..................... 382/111 |
| 5,333,111 | 7/1994 | Chaiken et al. .................. 364/470.06 |
| 5,353,355 | 10/1994 | Takagi et al. ........................ 382/111 |
| 5,487,011 | 1/1996 | Chaiken .......................... 364/470.06 |
| 5,563,796 | 10/1996 | Biegger ........................... 364/470.01 |
| 5,614,115 | 3/1997 | Horton et al. ..................... 219/121.67 |

Primary Examiner—Reba I. Elmore
Assistant Examiner—Robert J. Dolan
Attorney, Agent, or Firm—Jenkins & Wilson, P.A.

[57] ABSTRACT

A method and apparatus for correctively guiding an item on a desired path along a material is provided wherein a guide path matching a desired path for an item to be guided along a material and a plurality of templates containing images of the material are inputted into a computer. The item is guided along the material in a path following the inputted guide path, and a need for correction of the actual path of the item along the material is checked and, where necessary, correction is made at predetermined, inputted intervals. Self-correction of the path the item follows along material is accomplished by visual recognition of templates containing images of the material matching previously inputted templates.

35 Claims, 7 Drawing Sheets

METHOD AND APPARATUS FOR CORRECTIVELY GUIDING A CUTTING DEVICE ON A PREDETERMINED PATH ALONG A SHEET MATERIAL

TECHNICAL FIELD

The present invention relates generally to a method and apparatus for correctively guiding an item on a path along a material. More particularly, the present invention relates to a method and apparatus using visual recognition for correctively guiding an item on a path along a material, such as for correctively guiding a cutting device along a sheet of textile material.

RELATED ART

It is advantageous to be able to guide an item on a predetermined or desired path along a material for a variety of reasons, including without limitation, doing so to cut, fuse, mark, paint, inspect and/or sew a material. Guiding an item on a desired path along a material is of particular significance with materials such as sheets of textile material. Lace in particular is one form of textile material for which it is desirable to guide a cutting device on a predetermined path therealong to cut patterns from the lace. It has been common in the past to guide an item by hand when it became desirable to have the item move along or follow a predetermined path along a material. Mechanically guiding an item such as a cutting device on a desired path along a material such as a sheet of textile material has also been performed in the past and has been accomplished by making a cutting device follow a specific path that has been marked or constructed in the material to be cut whereby the path serves as a guide for cutting. This method is often referred to as "line scan", and it suffers from at least several shortcomings such as requiring that the path to be followed actually be on the material to be cut. Additionally, line scan cutting is limited as to the styles or patterns and depth of materials to be cut, and line scan cutting provides no real-time, self-correction for correcting the position of the item when it gets off of the desired path along a material.

In light of the prior art methods discussed above, there exists substantial room for improvement within the art for guiding an item such as a cutting device on a desired path along a material such as a sheet of textile material. Moreover, there exists a great need for a method and apparatus for correctively guiding an item such as a cutting device on a desired path along a material such as a sheet of textile material.

SUMMARY AND OBJECTS OF THE INVENTION

The present invention accordingly provides a method and apparatus for correctively guiding an item such as a cutting device on a desired path along a material such as a sheet of textile material using visual recognition of the material as the item is guided on a predetermined path along the material. The method according to this invention comprises the steps of: inputting into a computer a guide path matching a desired path for an item to be guided along a material; guiding the item along the material in a path following the inputted guide path; at predetermined inputted intervals, identifying whether the item is on or off of the desired path and the extent to which the item is off of the desired path along the material; and automatically correcting a position of the item when the item is off of the desired path to allow the item to follow the desired path along the material. The apparatus according to this invention comprises: guide path input means for inputting into a computer a guide path matching a desired path for an item to be guided along a material; guide means for guiding the item along the material in a path following the guide path; identification means for identifying at predetermined inputted intervals whether the item is on or off the desired path and, when off of the path, the extent to which the item is off of the desired path along the material; and correcting means for automatically correcting a position of the item when the item is off of the desired path to allow the item to follow the desired path.

The method and apparatus according to this invention is particularly suitable for correctively guiding a cutting device such as a laser on a desired path along a material such as a sheet of textile material, which in one application can be lace.

Accordingly, it is an object of the present invention to provide a novel method and apparatus for correctively guiding an item on a path along a material, such as for correctively guiding a cutting device in the form of a laser beam in a desired path along a sheet of textile material, particularly lace.

It is another object of the present invention to provide a method and apparatus which can accurately, reliably and quickly be used to guide an item on a desired path along a material and use real-time correction to correct a position of the item when it gets off of the desired path.

It is a further object of the present invention to provide a method and apparatus which uses visual recognition of previously inputted images to correctively guide an item on a desired path along a material.

It is still a further object of the present invention to provide a method and apparatus for correctively guiding an item on a desired path along a material which alleviates the need for knitting, sewing or marking a guide line path on an actual material to be cut for an item such as a cutting device to follow on a sheet of textile material.

These as well as other objects are accomplished by the present invention. Some of the objects and advantages of the invention having been stated, other objects and advantages will become evident as the description proceeds, when taken in connection with the accompanying figures described below.

DETAILED DESCRIPTION

The present invention provides a method and apparatus for electromechanically guiding an item on a desired path along a material. It is contemplated that the present invention has widespread application to guide a variety of items on a desired path along a variety of materials for diverse purposes. The variety of items contemplated herein include, without limitation, devices usable to cut, fuse, mark, paint, inspect and/or sew on a material. While various materials can be used according to this invention, the method and apparatus as taught herein are particularly suitable for application to material such as sheets of textile material, particularly lace.

It will be understood from the description which follows that the present invention can utilize a variety of items and materials. For purposes of illustration, however, and not limitation, the following description is provided bearing particular focus on use of the present invention for correctively guiding a cutting device in the form of a laser focusing device on a predetermined path along a sheet of textile material.

Figure 1:
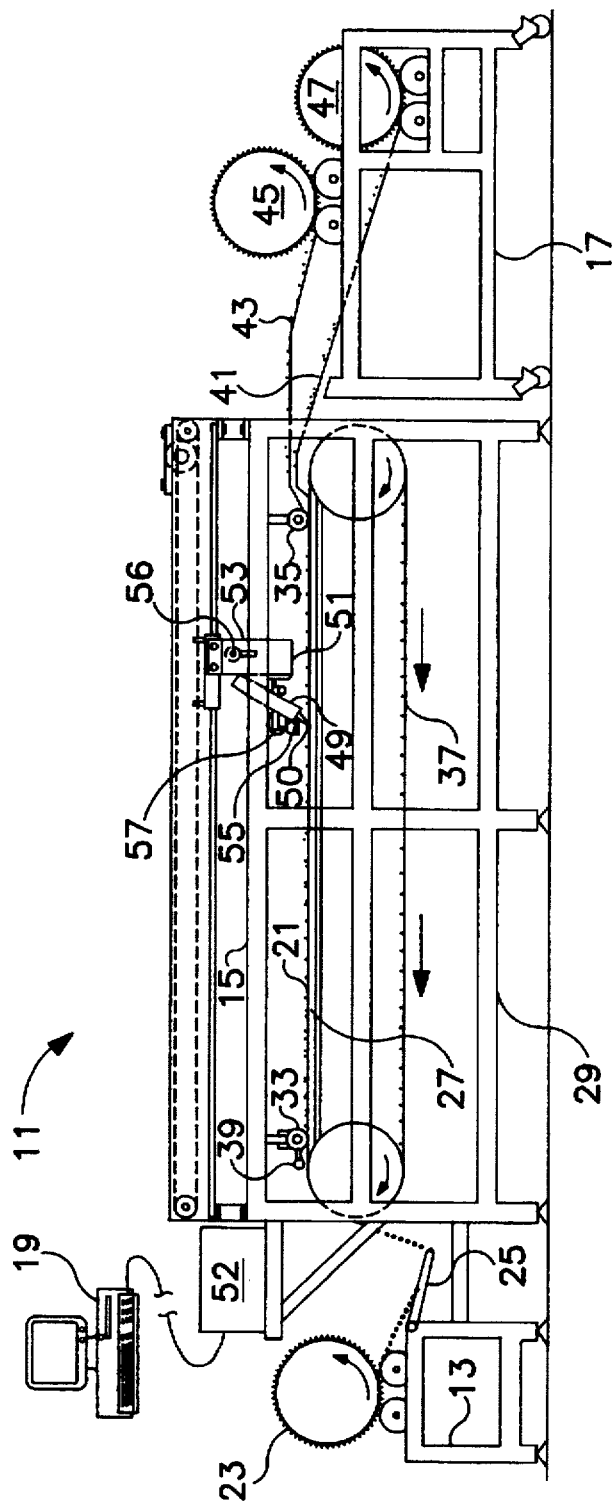
FIG. 1 of the drawings is an elevated side view of a preferred embodiment of the apparatus according to the present invention working with a material.
Figure 2:
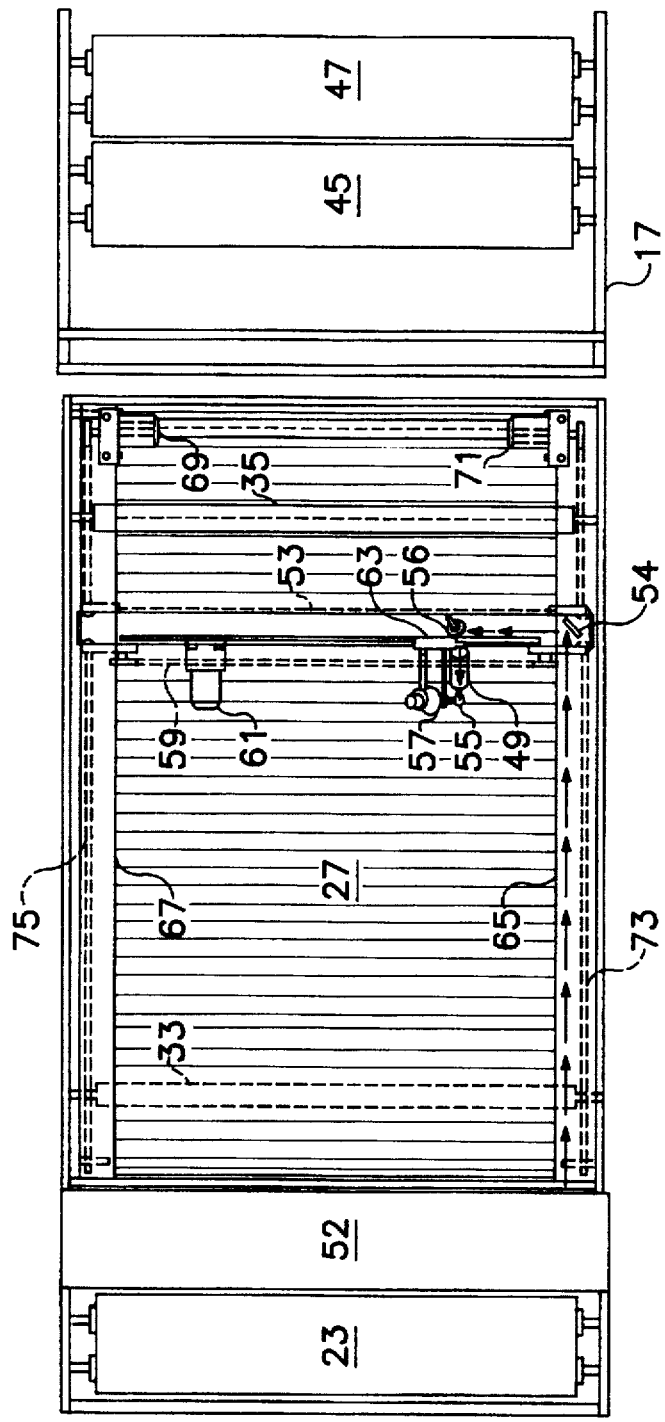
FIG. 2 of the drawings is a top plan view of the a preferred embodiment of the apparatus of the present invention.
Figure 3:
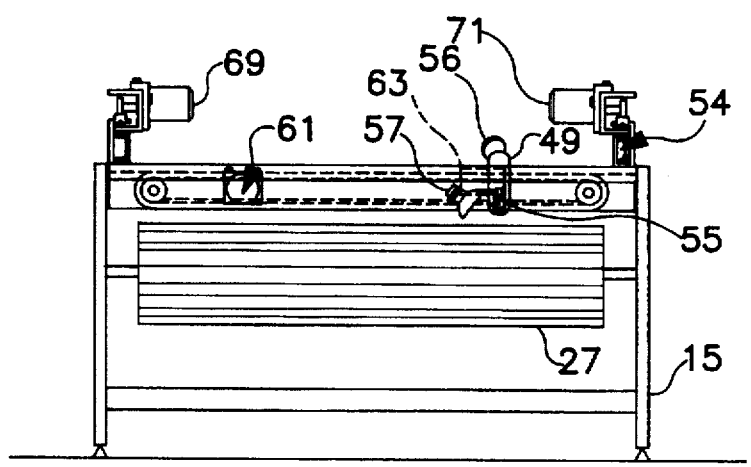
FIG. 3 of the drawings is an end view of the conveyor section of the apparatus of the present invention.

Referring to FIGS. 1 through 3 of the drawings, apparatus 11 is illustrated and comprises a take-off unit 13, a conveyor section 15, a take-up unit 17 and a computer 19. Computer 19 is an ADEPT brand, model number MV-8 having a 68040 microprocessor with vision-guided motion with kinematic support or module, utilizing "V+ Extensions" software.

APPARATUS OF THE INVENTION

Take-off unit 13 feeds a textile material 21 to conveyor section 15 and can be of any conventional design such as a simple double roller design that offers a cradle for supporting a bolt 23 of material 21. This configuration allows for a friction drive to feed a sheet of material to conveyor section 15 which can then transport material 21. While material 21 can be a variety of textile materials, material 21 is lace in a preferred embodiment and for description purposes herein. A floating bar 25 can be included on take-off unit 13 to measure the rate at which material 21 is pulled by conveyor 27 of conveyor section 15 and control the rate of take-off of material 21.

Conveyor section 15 of apparatus 11 comprises a support frame 29 on which conveyor 27 is carried. Conveyor 27 conveys material 21 from take-off unit 13 to take-up unit 17 in a controlled and substantially non-tensioned state. A rubber roller 33 (omitted in FIG. 3) can be used in conveyor section 15 so that material 21 passes under rubber roller 33 to isolate pulling pressure and to allow material 21 to lie flat and stretch free in its natural state as desired in the preferred embodiment of this invention. A second rubber roller 35 can also be used in conveyor section 15 whereby material 21 passes under rubber roller 35 just before leaving conveyor 27 so that the pulling pressure from take-up unit 17 is isolated from conveyor 27 between rubber rollers 33 and 35.

When the item utilized in accordance with this invention is a laser to act, for example, as a cutting device as discussed further below, it has been found to be quite advantageous for conveyor 27 to be flat within 1/16 of an inch to prevent varying performance of the laser. Additionally, conveyor 27 can comprise a series of metal, preferably aluminum, panels 37 which are resistant to the laser beam from the laser other than discoloration of finish from an etching effect. The inner cores of panels 37 can be made from thick, lightweight aluminum honeycomb inserts that absorb and dissipate the laser beam.

Conveyor section 15 can include an encoder 39 mounted on rubber roller 33 to provide an accurate linear measurement of material 21 coming onto conveyor 27. This information can be passed to computer 19 to control starting and stopping of conveyor 27 and the speed at which conveyor 27 runs.

Material 21 passing from conveyor 27 is collected on take-up unit 17 which can be of any conventional design. It is preferred in accordance with this invention, however, that take-up unit 17 comprise supports 41 and 43 to provide support for materials having loose, floppy edges all the way to a re-roll bolt. In order to re-roll split rolls, two sets of cradle assemblies can exist on take-up unit 17 to hold two bolts such as re-roll bolts 45 and 47. Supports 41 and 43 therefore can be used to completely support material leaving conveyor 27 as it is passed to bolts 45 and 47, and such supports help prevent folding over of the material to be rolled into the bolts which could cause problems in subsequent processing. Take-up unit 17 can be connected to computer 19 so that take-up unit 17 receives the same signal as conveyor 27 for speed, starting, and stopping.

The configuration of the apparatus described above is most suitable for moving textile material, such as lace, to and by an item such as laser focusing device 49. It is, however, fully contemplated that apparatuses of other configurations could be used in accordance with this invention to move material by an item which is guided on a desired path on the material. Additionally, it is fully contemplated that the present invention could be used to guide items other than a laser focusing device and other than a cutting device by a variety of materials. Whatever the item, it is preferred that the item be mounted to a head assembly 51 which itself is attached to a gantry bar 53, best illustrated in FIGS. 2 and 3. As illustrated in FIGS. 1–3, a camera 55 is also mounted to head assembly 51, and a lamp such as lamp 57 can be additionally mounted to head assembly 51.

Head assembly 51 with an item attached thereto is movably attached to gantry bar 53 and uses a linear system to travel across gantry bar 53 in a direction referred to herein as transverse. Transverse drive chain 59 is attached to gantry bar 53 and extends the length thereof as transverse drive motor 61 can be used to move drive chain 59. Head assembly 51 is attached to a transverse carriage 63 which is slidably attached to gantry bar 53 so that head assembly 51 can be moved along the length of gantry bar 53 as driven by drive chain 59. In a preferred embodiment, drive chain 59 comprises a pulley and timing belt system connected to head assembly 51 to move head assembly 51 linearly back and forth across gantry bar 53.

In accordance with this invention, head assembly 51 can also be moved back and forth in a direction referred to herein as the longitudinal direction which is perpendicular to gantry bar 53 and its transverse direction. While movement of head assembly 51 in the longitudinal direction can be accomplished by any conventional means, such movement of head assembly 51 is preferably accomplished by movement of the entire gantry bar 53 back and forth as desired in the longitudinal direction above conveyor 27. Gantry bar 53 extends between and connects with two opposing upper rails 65 and 67 as shown in FIGS. 1–3. Two opposing longitudinal drive motors 69 and 71 are used to drive longitudinal drive chains 73 and 75, respectively, which are connected to opposing ends of gantry bar 53. Using this configuration, gantry bar 53 with head assembly 51 attached thereto can be linearly moved back and forth in the longitudinal direction perpendicular to the linear, transverse direction in which head assembly 51 can be moved along gantry bar 53. It is therefore understood that head assembly 51 with an item, such as a cutting device in the form of laser focusing device 49, can be securely maintained at a distance above conveyor 27 and moved in both the coplanar transverse and longitudinal directions. Additionally, movement of head assembly 51 in both the transverse and longitudinal directions simultaneously can occur during operation of apparatus 11 to effectively move head assembly 51 in a diagonal direction with respect to conveyor 27. The drives systems utilized in apparatus 11 as described above can therefore be used to move a variety of items, such as laser focusing device 49, on a desired path along a material such as material 21.

To control movement of head assembly 51 and gantry bar 53 through computer 19, a number of limit switches can be utilized and communicate with computer 19 so that over-travel in both the traverse and longitudinal directions can be prevented. Additional controlled movement can be accomplished by using internal encoders 85, 87, and 89 on drive motors 61, 69, and 71 respectively to send information to computer 19 regarding motor position and velocity to be used during operation. Information sent to and processed by computer 19 is used by computer 19 to send controlling information to drive motors 61, 69, and 71 telling each motor if and how to move in order to get an item carried by head assembly 51 in a desired position.

In accordance with this invention, the item attached to head assembly 51 can be laser focusing device 49 through which is passed a laser beam 50 from laser 52 to cut material 21. Laser 52 is preferably positioned on an end of conveyor section 15 and can be an ELECTROX M140 laser which has been found to be of sufficient power to efficiently cut lace. The laser beam produced from laser 52 passes in the longitudinal direction along conveyor section 15 and contacts a series of mirrors 54 and 56 which are angled so that after passing longitudinally, the beam is directed by mirror 54 transversely down gantry bar 53 toward head assembly 51. Mirror 56 is positioned on head assembly 51 and directs the beam through laser focusing device 49 to material 21.

A primary channel for inputting information into computer 19 is the vision system utilized according to this invention. As further explained below regarding the method of this invention, the use of camera 55 enables computer 19 to get a real-time feedback of exactly where an item mounted to head assembly 51 is in a position above a material carried on conveyor 27. This information is compared by computer 19 with previously inputted information regarding a material carried by conveyor 27, and computer 19 causes the position of head assembly 51 and any item carried thereon to be adjusted for accuracy as needed. As further explained below, the inputted information regarding a material carried by conveyor 27 is obtained and inputted into computer 19 by taking still pictures of key spots in a material carried on conveyor 27, and the need for and extent of adjustments to be made in the position of head assembly 51 is determined by comparing pictures taken during operation of apparatus 11 of material carried on conveyor 27 with the previously inputted still pictures of material carried by conveyor 27.

METHOD OF THE INVENTION

The method according to the present invention will now be described with reference to the figures of drawing. The exemplary item attached to head assembly 51 is laser focusing device 49, and material 21 is lace for illustration purposes in this following description of the method according to this invention. While laser focusing device 49 is guided on a desired path along the lace in the following description of the method of this invention, such description is not intended to limit or restrict use of the present invention as it is envisioned that the present invention can be used with items other than laser focusing devices and materials other than lace. Understanding the diverse applications and uses of the method and apparatus of this invention, the method and apparatus will now be discussed with reference to a particular application wherein laser focusing device 49 is used to cut a desired path along lace.

The bolt of lace is placed upon take-off unit 13 and a continuous sheet of the lace is fed to conveyor 27 of conveyor section 15 to lie upon and be moved by conveyor 27. After passing under rubber roller 33 and prior to passing under rubber roller 35, the lace is passed by conveyor 27 under head assembly 51 and laser focusing device 49 mounted thereto. Since camera 55 is mounted to head assembly 51, the lace also passes under camera 55 near or at the same time it passes under laser focusing device 49 depending on the position of camera 55. It is preferred that camera 55 be positioned so that the actual area at which the laser beam will contact the lace is within the view of camera 55. Without operation of the laser to cut, as much or as little of the lace as desired can be moved by conveyor 27 underneath camera 55 forward and/or backward in the longitudinal direction along conveyor section 15.

Camera 55 is electrically connected to and communicates with computer 19, and camera 55 can be adjusted by movement of head assembly 51 to view and input into memory within computer 19 pictures or images of the lace. Computer 19 includes a monitor for viewing what camera 55 views. In this manner, a picture of the lace can be seen on the computer monitor, and an operator can use computer 19 to input a guide path for an item or items attached to head assembly 51 to follow.

The guide path can be very easily inputted into the computer by the operator using computer 19 to draw lines on the computer monitor to instruct head assembly 51 and an item or items attached thereto as to the guide path to be followed. This guide path can be established as desired regardless of the shape or structure of the lace and can be continuous or discontinuous. It is preferred that the guide path be inputted into computer 19 while the lace is being viewed by camera 55 as viewable on the computer monitor so that the guide path can be inputted to match a desired path on the lace itself along which it is intended that laser focusing device 49 follow. With the lace pictured on the computer monitor, inputting the guide path is as easy as clicking a mouse connected to computer 19 to place a number of dots which are connected by a line or lines indicating the guide path for laser focusing device 49 to follow.

After the guide path is inputted into computer 19 as desired, a number of templates containing selected images of material 21 are selected and inputted. Such templates can be selected on or off of the previously inputted guide path and can be of various types. As with the guide path, selection of the templates occurs while the lace is being viewed by camera 55 as seen on the computer monitor of computer 19.

Figure 4:
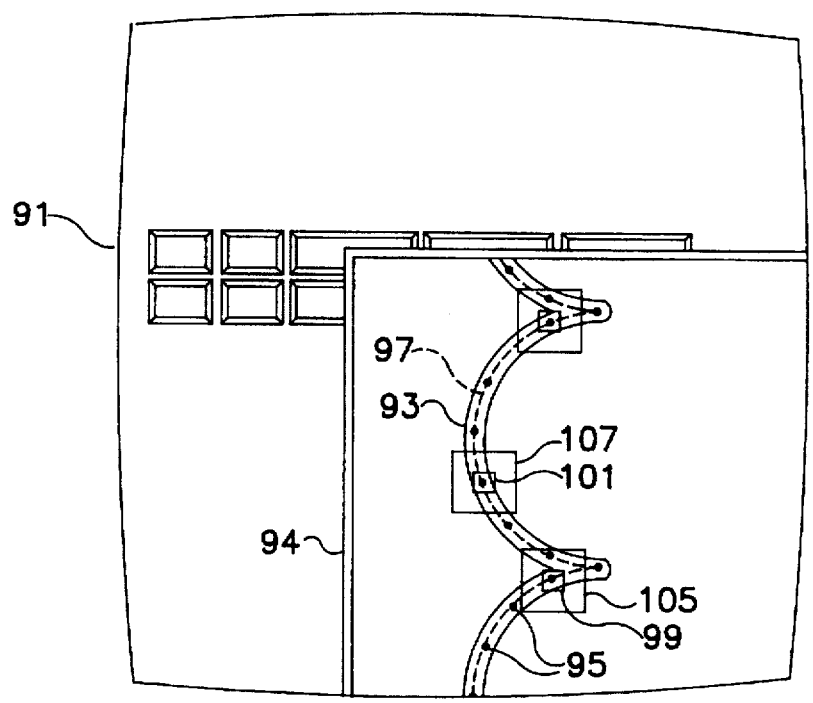
FIGS. 4, 4A, 5, 5A, 6 and 6A of the drawings are views of the monitor screen of the computer working in accordance with the present invention.

FIG. 4 of the drawings illustrates computer monitor screen 91 of computer 19 which is an instantaneous view during the process of inputting the guide path into computer 19. View box 94 is displayed and is of primary concern herein, however, a variety of numerical, processing information pertaining to this method and apparatus can also be displayed on the computer monitor. As shown, view box 94 illustrates a view of the lace through camera 55, and the path along the lace which is intended to be cut can be chosen and is designated as desired path 93. Within desired path 93, a series of dots, such as dots 95 have been marked and placed and are connected, for illustration purposes, by a dashed line which represents the inputted guide path 97 which laser focusing device 49 will actually follow. Guide path 97 as shown is continuous, but can be discontinuous so that computer 19 can control cutting to occur between two points and then stop and resume cutting between two subsequent points along the guide path as desired.

After the guide path is defined, the templates are then defined, and each template selected and inputted is positioned centrally within a defined search area. Computer screen 91 of FIG. 4 illustrates templates such as templates 99 and 101 each within a search area such as search areas 105 and 107 respectively. An operator can simply input into computer 19 desired intervals for the templates along the guide path, and computer 19 will place a template at each selected interval on the guide path. Each template will by default be rectangular in shape and will be of a predetermined size. The size and shape of the templates, together or individually, can be changed as desired. As with the templates, the view areas by default are rectangular and of a predetermined size but can also be altered as to their sizes, but each needs to be of a size larger than the template contained therein. Computer 19 automatically positions each template precisely in the center of a larger search area as shown in FIG. 4. As an example, the templates shown in FIG. 4 are defined at every four (4) points or dots along guide path 97.

Figure 4A:
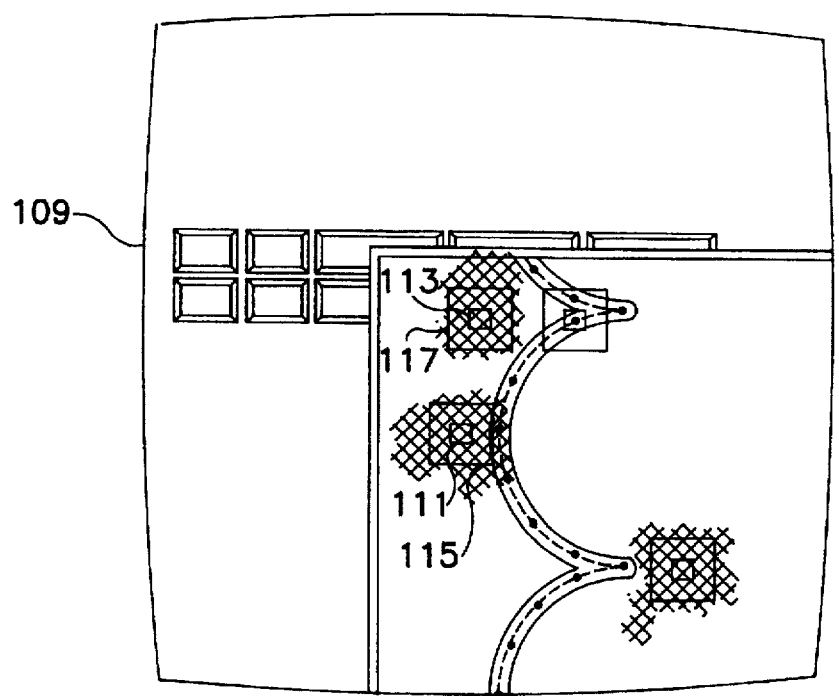

While the templates as shown in FIG. 4 are automatically placed on the established guide path, the templates can subsequently be individually moved to various positions off of the guide path. Computer screen 109 of FIG. 4A is similar to computer screen 91 of FIG. 4 except shows the templates, such as templates 111 and 113, off of the established guide path. The search areas, such as search areas 115 and 117, move with their enclosed templates so that each template remains positioned in the center of a search area as shown in FIG. 4A. The templates can therefore be positioned as desired over any area of a material viewable on the computer monitor.

Once the templates are positioned as desired over images of the material, here lace, passing under camera 55, the templates are inputted into the memory of computer 19 by computer 19 memorizing the images within each template. The lace can be moved continuously or discontinuously under camera 55, or camera 55 or head assembly 51 can be moved along the lace so that additional areas of the lace can be viewed by camera 55 and on the computer monitor. As additional areas of the lace are viewed, the guide path and the templates can be defined and inputted as described above. A guide path can be first established along an entire length of the lace before the templates are defined and inputted.

There are a variety of forms or types of images which can be used with the templates in accordance with this invention. Some materials, especially textile materials such as lace, will have openings in the material which are sometimes referred to as "blobs", and it is frequently desirable to cut along a path of such openings. These openings can appear as holes of various shapes and sizes between the threads of textile materials, and this is especially true with lace where such openings are usually abundant.

Templates according to this invention can be from images of material containing blobs when a desired path to be followed passes along the blobs. This is particularly applicable when a straight path along blobs is to be cut. Computer 19 can be used to initiate what can be referred to as "blob cutting" wherein a starting point and an ending point can be inputted into computer 19 while viewing the material on the computer monitor. Computer 19 will then establish a line between those two points which serves as the guide path to be followed for blob cutting. Alternatively, only a starting point and direction can be inputted and computer 19 will cut in a straight path and sense when the end of the path on the material is reached and stop cutting at that point.

In preparation for blob cutting, computer 19 will self-generate search areas of predetermined size and shape at predetermined intervals on the blob cutting guide path and memorize a template centrally located within the search area containing the blob. The blob cutting guide path comprises a series of points which are each in the center of a blob, and computer 19 can memorize blob sizes. Such templates are inputted into computer 19 and computer 19 can guide an item, such as laser focusing device 49, on a path along the blobs by the ability of computer 19 to recognize minimum and maximum blob sizes as cut points and to control cutting therealong, as explained further below. This type of recognition by computer 19 is referred to as "binary searching", and typically involves the computer seeing only black and white images with the blobs being the black and the material being the white. Instead of using binary searching to follow a path along such blobs, computer 19 can also search and recognize "gray-scale" images.

Another form or type of image over which the templates can be positioned according to this invention is an image of the actual pattern on a material such as patterns defined by the threads of a textile material. Practically any desired pattern from a material can be inputted into computer 19 as long as it can be viewed by camera 55.

Once a guide path and the templates have been inputted for any given type of material such as lace, such information can be saved to a diskette which can repeatedly be used in computer 19 to correctively cut the material, here the lace, from which the diskette was created. This feature is quite advantageous in that numerous materials with differing patterns can be separately run through apparatus 11 and a previously created diskette specific to a certain type pattern of material can be inserted into computer 19 to avoid having to separately create a guide path and define templates each time a certain type of material is run repeatedly through apparatus 11.

Once the information described above has been inputted into computer 19, apparatus 11 is ready to guide an item on a path along a material, in this case, to guide laser focusing device 49 on a path to cut along material such as lace carried on conveyor 27. The actual path along which an item follows is determined by and matches the inputted guide path, which can shift as described below. Although laser focusing device 49 can be correctively guided on a desired path along the lace while the lace is in a stationary position not being moved by conveyor 27, apparatus 11 is particularly suitable for correctively guiding laser focusing device 49 on a desired path along the lace as the lace is passing by laser focusing device 49 as moved by conveyor 27.

Even when an item such as laser focusing device 49 is guided on a predetermined path such as the inputted guide path, it is common for some error to occur and, for example, such error can be generated by movement of a material on conveyor 27 or could be inherent in the material due to deviations in processing of the material, especially when the material is a textile material such as lace. The position and shape of a textile material such as lace passing on conveyor 27 can change due to various factors, such as stretching and warping. A particular advantage of the present invention is that apparatus 11 can identify whether an item such as laser focusing device 49 is on or off of a desired path along a material. Additionally, apparatus 11 can detect an extent to which an item such as laser focusing device 49 is off of a desired path along a material. As explained further below, apparatus 11 can automatically correct the position of an item carried on head assembly 51, such as laser focusing device 49, to move the item back to the desired path once it is detected that the item is off of and no longer following the desired path along a material.

Despite the fact that the route taken by laser focusing device 49 along the lace is determined by the previously inputted guide path, the actual path along which laser focusing device 49 passes should be the same as the previously inputted guide path, subject to any errors that have been generated in the lace itself by movement along conveyor 27 or factors such as stretching and warping.

During operation of apparatus 11, a view of the material, as seen through camera 55, being moved by conveyor 27, can be seen on the computer monitor of computer 19. The path along which an item, such as laser focusing device 49, actually follows is determined by and matches a previously inputted guide path as the computer controls an item point by point progressively along the guide path. When points on the guide path are reached that have been previously inputted as intervals for the templates, computer 19 will automatically scan, at each such interval or point, the image of the moving material within or underlying the search area for that interval.

Computer 19 searches within each of the previously defined search areas for a template which matches the one previously inputted for that interval on the guide path. Once a matching template is found and recognized by computer 19, computer 19 can identify whether the item on head assembly 51 is actually following on or off of the desired path on the material by comparing the position of the matching template within its search area with the template previously inputted which was in the center of the search area. If the matching template found by computer 19 is in the center of the search area, then it matches the previously inputted template for that interval and no need for correction exists.

When, however, the matching template found is off-center within the search area, computer 19 identifies the off-center template and this indicates that an error has occurred in the actual path of the item on the material. Computer 19 compares the position of the matching template within the search area for that interval with the position of the previously inputted, centrally positioned template for that search box, and computer 19 shifts the entire guide path from that point on. The guide path is shifted the extent to which the matching template was off-center. This movement and precise redefining of the guide path from that point on corrects the actual position of the item on the material by causing it to be moved to and follow the newly defined guide path which now once again matches the actual path intended to be followed on the material.

This self-correction of the position of head assembly 51 and an item carried thereon can be set to occur at the desired intervals during inputting of the templates as described above. Where great accuracy is desired for an item to be guided on a path along a material, the intervals at which self-correction is checked and can occur can be defined at intervals or points along the guide path very close together so that the item will not have a chance to get severely off of the desired path.

Figure 5:
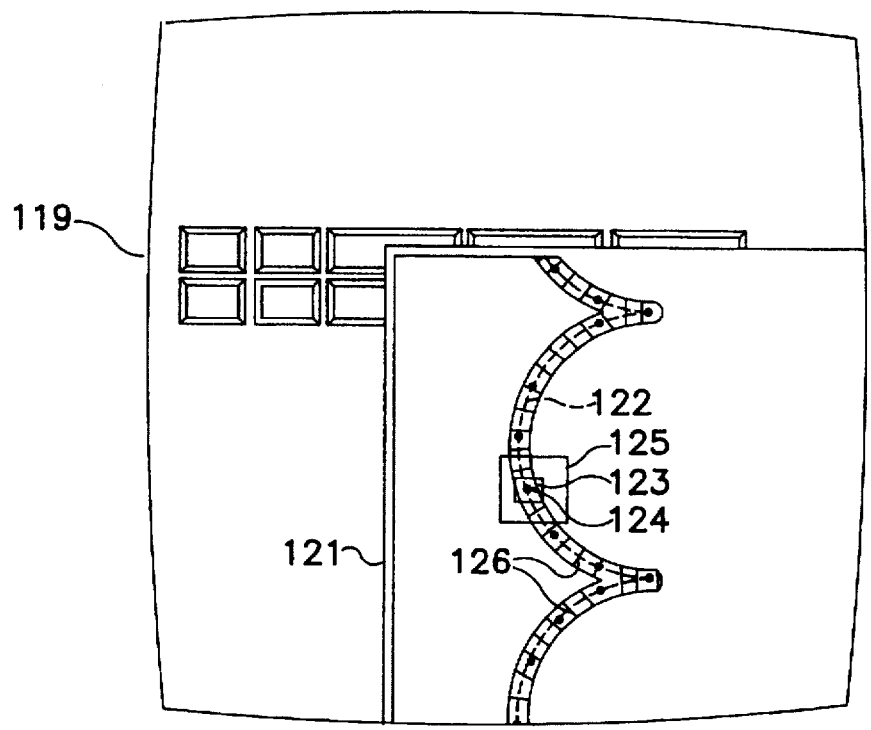

Referring to FIG. 5 of the drawings, computer screen 119 from the computer monitor of computer 19 is illustrated and shows, in view box 121, the view that camera 55 sees of the lace as laser focusing device 49 is guided on a path therealong. View box 121 is an inset box in the lower right corner of screen 119 and represents an instantaneous view of the lace through camera 55 as laser cutting device 49 is guided along the lace. Although laser focusing device 49 can be moved and guided without conveyor 27 moving the material, apparatus 11 is particularly suitable for guiding an item along a material being moved by conveyor 27. As laser focusing device 49 passes along the lace on a path determined by and matching the previously inputted guide path, a real-time view through camera 55, lighted by lamp 57, can be seen in view box 121. As described above, apparatus 11 can identify whether laser focusing device 49 is on or off of the actual, desired cutting path on the lace and correct the position of laser focusing device 49 if necessary to allow it to follow the actual, desired cutting path.

View box 121 of FIG. 5 illustrates a template 123 within a search box 125. As seen in view box 121, guide path 122 has been followed up to point 124, which has been previously established as a correction checkpoint. Threads, such as threads 126, have been cut on guide path 122 up to point 124. Upon reaching the predetermined point 124 along guide path 122 where computer 19 will check for a need for self-correction, search box 125 appears in its predetermined position over the image of the lace on the screen, and computer 19 scans within search box 125 for a template which matches the one previously inputted in the center of search box 125. FIG. 5 shows a situation where template 123 has been recognized by computer 19 as matching the template previously inputted for that interval. Since matching template 123 is located in the center of search box 125, no need for correction of guide path 122 needs to occur, and the operation of apparatus 11 continues. When the next checkpoint is reached along the guide path, computer 19 will again scan the area within the previously defined search box for a matching template.

Figure 5A:
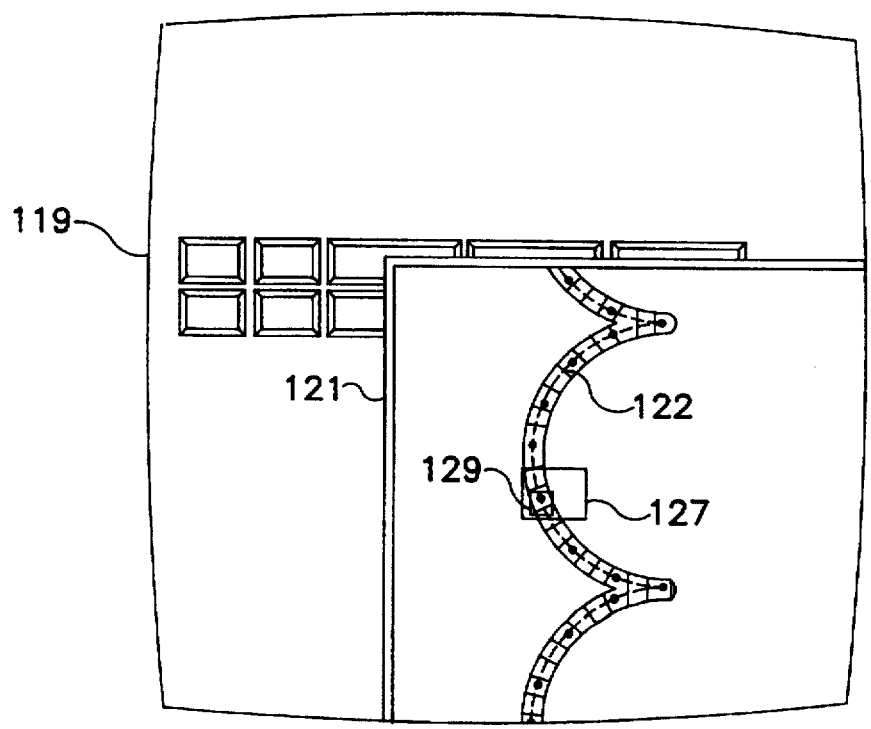

FIG. 5A is similar to FIG. 5 in that the view box shows a search box 127 at a point along the guide path and a matching template 129 therein. Here, however, matching template 129 has just been found off-center within search box 127 which means that an item such as laser focusing device 49 is at least somewhat off of the desired path intended to be followed on the material. Computer 19 will then shift and re-define the guide path from that point on and cause the item to follow the new guide path. Since the extent to which template 123 is off-center is the extent to which the guide path is shifted, the new guide path matches the actual, desired cutting path as matched by the originally inputted guide path. Ideally, the correction checkpoints will be inputted so close together that the item never has a chance to get far off of the desired path before another checkpoint is reached.

Figure 6:
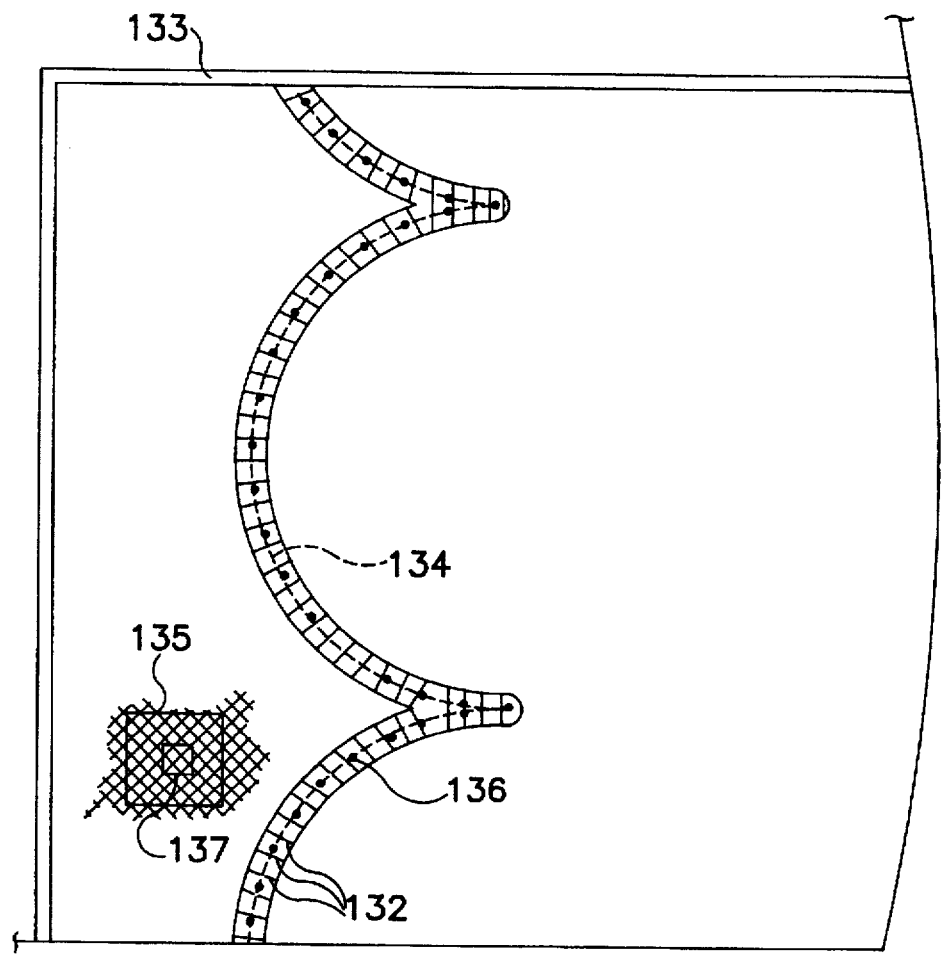

FIG. 6 of the drawings shows view box 133 which would be on a computer monitor. As with FIGS. 5 and 5A, view box 133 represents a view of the material passing under camera 55 during operation of apparatus 11. Guide path 134 has been followed up to point 136 as threads, such as threads 132, have been cut up to point 136. View box 133 shows search box 135 which was previously inputted off of guide path 134 for point 136 of guide path 134. Upon reaching predetermined point 136 along the guide path, computer 19 searches within previously inputted search box 135 for a template matching the template previously inputted in the center of search box 135. View box 133 shows a matching template 137 found in the center of search box 135, and therefore no correction will be made by computer 19.

Figure 6A:
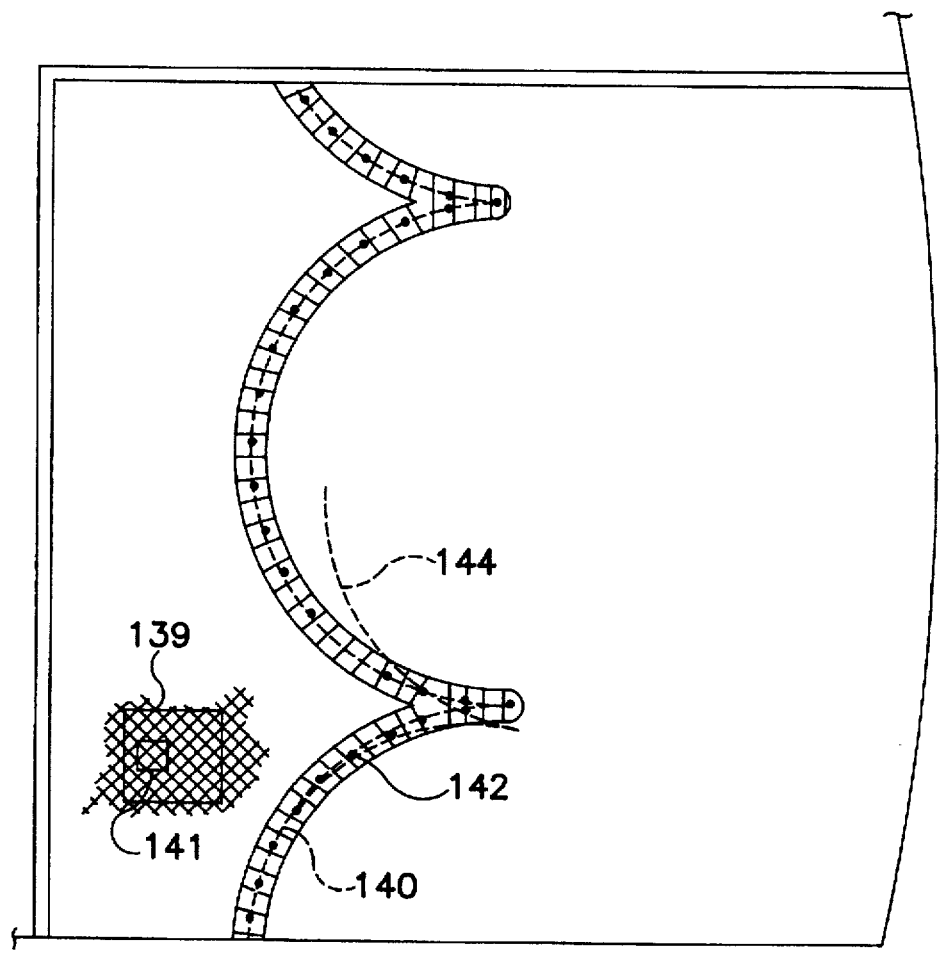

FIG. 6A is similar to FIG. 6 in that computer 19 scans a search box 139 off of guide path 140 for a matching template. Matching template 141, however, as shown is found in a position off of the center of search box 139, and computer 19 will therefore make a correction according to the extent to which template 141 is off-center within search box 139. This extent, as discussed above, is determined by comparing the position of matching template 141 within search box 139 to the centrally positioned template previously inputted for search box 139. As discussed previously, correction is made by shifting and re-defining the guide path inputted originally. Original guide path 140 was followed up to point 142 where correction was checked and found to be needed. The original guide path shifts from point 142 on so that the desired path on the lace will be followed. For illustration purposes, the original guide path is shown as dashed line 144 past point 142, and the shifted guide path is designated as 146 and starts at point 142.

The apparatus and method of this invention can also be used to cut along a straight path of openings or blobs as discussed previously. When the images comprise a configuration of blobs, computer 19 can perform binary searching for minimum and maximum sizes of the blobs comparing viewed areas of material with previously inputted templates of the blobs. Once the blob cutting path and templates have been inputted as described earlier, computer 19 can be used to initiate blob cutting wherein cutting begins at the starting point and continues along the inputted guide path as self-correction is checked and made where necessary at the previously established checkpoints. If only a starting point and direction were previously inputted, without an ending point, computer 19 will cut along the guide path and will sense when the end of the path on the material is reached and stop cutting at that point. During blob cutting, previously inputted template images of blobs are utilized by computer 19 during cutting for identifying the need for self-correction and actually self-correcting the position of the cutting device as conducted during cutting of a non-blob path.

It is therefore seen that the present invention provides a novel method and apparatus for correctively guiding an item on a path along a material, such as for correctively guiding a cutting device in the form of a laser beam in a desired path along a sheet of textile material such as lace. It is also seen that the present invention provides a method and apparatus which can accurately, reliably and quickly be used to guide an item on a desired path along a material. It is further seen that the present invention provides a method and apparatus which uses visual recognition of previously inputted images to correctively guide an item on a desired path along a material. It is still further seen that the present invention provides a method and apparatus for correctively guiding an item on a desired path along a material which alleviates the need for knitting, sewing or making a guide line path on the actual material to be cut for an item such as a cutting device to follow on a sheet of textile material. It is believed that the method and apparatus of this invention provides a significant advancement in the art of guiding an item such as a cutting device and a desired path along a material such as a textile material. It will be understood that various details of the present invention may be changed without departing from the scope of the invention. Furthermore, the foregoing description is for the purpose of illustration only, and not for the purpose of limitation as the invention is defined by the following appended claims.

What is claimed is:

1. A method of correctively guiding an item on a path along a material, said method comprising the steps of:

(a) inputting into a computer a guide path comprising predetermined points thereamong, said guide path matching a desired path for an item to be guided along a material wherein inputting said guide path comprises inputting into said computer at each of said predetermined points a template containing an image of said material and inputting a search area surrounding each inputted template;

(b) guiding said item along said material in a path following said inputted guide path;

(c) at each of said predetermined points of said guide path, identifying whether said item is on or off of said desired path along said material, said identifying comprising said computer scanning templates containing images of said material within each search area whereby said computer locates a matching template within each search area that matches an inputted template for that search area; and (d) at each of said predetermined points of said guide path, correcting a position of said item when said item is off of said desired path to allow said item to follow said desired path along said material.

2. The method of claim 1 wherein correcting said position of said item occurs automatically after identifying that said item is off of said desired path along said material.

3. The method of claim 1 wherein correcting said position of said item comprises moving said item to follow said desired path.

4. The method of claim 1 wherein said step of correcting a position of said item comprises adjusting said inputted guide path an extent to which the position of a matching template differs from the position of an inputted template for each search area.

5. The method of claim 1 wherein a camera provides images of said material.

6. The method of claim 1 wherein each inputted template is selected on said guide path.

7. The method of claim 1 wherein each inputted template is selected off of said guide path.

8. The method of claim 1 wherein each inputted template is positioned in the center of a search area and wherein said computer compares a position of said matching template to a position of said inputted template within each search area.

9. The method of claim 8 further comprising saving said inputted guide path and templates in a memory associated with said computer.

10. The method of claim 1 wherein said material is moving by said item.

11. The method of claim 10 wherein said item is supported a distance from said material and is moveable in at least two (2) coplanar directions while maintained said distance from said material.

12. The method of claim 10 wherein said moving of said material by said item is accomplished by a conveyor.

13. The method of claim 1 wherein said material is a sheet of textile material and said item is a device utilized for cutting said textile material.

14. The method of claim 13 wherein said device utilized for cutting is a laser focusing device.

15. The method of claim 14 wherein said textile material is lace.

16. A self-correcting method of cutting a textile material along a desired path, said method comprising the steps of:

(a) inputting into a computer a guide path comprising predetermined points thereamong, said guide path matching a desired path for a cutting device to cut a textile material wherein inputting said guide path comprises inputting into said computer at each of said predetermined points a template containing an image of said textile material and inputting a search area surrounding each inputted template;

(b) guiding said cutting device along said textile material following said inputted guide path to cut said textile material along said desired path;

(c) at each of said predetermined points of said guide path, identifying whether said cutting device is on or off of said desired path along said textile material and an extent to which said cutting device is off of said desired path, said identifying comprising said computer scanning templates containing images of said textile material within said search area whereby said computer located a matching template within each search area that matches an inputted template for that search area; and (d) at each of said predetermined points of said guide path, correcting a position of said cutting device by moving said cutting device to said desired path.

17. The method of claim 16 wherein correcting comprises moving said cutting device an extent which equals the extent to which the cutting device was off of said desired path.

18. The method of claim 16 wherein said textile material is moving by said cutting device.

19. The method of claim 16 wherein correcting occurs automatically upon identifying that said cutting device is off of said desired path.

20. The method of claim 16 wherein each inputted template is positioned in the center of a search area and wherein said computer compares for each of said predetermined points a position of said matching template to a position of said inputted template within said search area.

21. The method of claim 20 wherein said step of correcting a position of said cutting device comprises adjusting said inputted guide path an extent to which the position of a matching template differs from the position of an inputted template for that search area.

22. The method of claim 21 wherein correcting a position of said cutting device occurs during cutting of said textile material by said cutting device.

23. An apparatus for correctively guiding an item on a path along a material, said apparatus comprising:

(a) computer means;

(b) guide path input means for inputting into said computer means a guide path comprising predetermined points thereamong, said guide path matching a desired path for an item to be guided along a material, said guide path input means comprising template input means for inputting into said computer means for each of said predetermined points of said guide path a template containing an image of the material and a search area surrounding said template;

(c) guide means responsive to said computer means for guiding said item along said material on a path following said guide path;

(d) identification means operatively associated with said computer means for identifying, at each of said predetermined points of said guide path, whether said item is on or off of said desired path along said material by scanning images of said material within each search area and locating a template within each search area matching an inputted template for that search area; and (e) correction means responsive to said computer means for correcting, at each of said predetermined points of said guide path, a position of said item when said item is off of said desired path to move said item to follow said desired path.

24. The apparatus of claim 23 further comprising movement means for moving said material by said item.

25. The apparatus of claim 23 wherein said identification means includes means for identifying an extent to which said item is off of said desired path, and said correction means includes means for correcting a position of said item said extent identified by said identification means.

26. The apparatus of claim 23 wherein said correction means is for correcting a position of said item while said guide means guides said item on a path along said material.

27. An apparatus for correctively guiding a device utilized for cutting on a desired path along a sheet of textile material, said apparatus comprising:

(a) computer means;

(b) guide path input means for inputting into said computer means a guide path comprising predetermined points thereamong, said guide path matching a desired path for said device to be guided along a sheet of textile material, said guide path input means comprising template input means for inputting into said computer means for each of said predetermined points of said guide path a template containing an image of the textile material and a search area surrounding said template;

(c) guide means responsive to said computer means for guiding said device along said sheet of textile material in a path following said guide path;

(d) identification means operatively associated with said computer means for identifying, at each of said predetermined points of said guide path, whether said device is on or off of said desired path along said sheet of textile material by scanning images of said textile material within each search area and locating a template within each search area matching an inputted template for that search area; and (e) correction means responsive to said computer means for correcting, at each of said predetermined points of said guide path, a position of said device when said device is off of said desired path to move said device to follow said desired path.

28. The apparatus of claim 27 wherein said identification means includes means for identifying an extent to which said device is off of said desired path and said correction means can correct a position of said device to said extent identified by said identification means.

29. The apparatus of claim 27 wherein said device is a laser focusing device.

30. The apparatus of claim 27 wherein said sheet of textile material is lace.

31. The apparatus of claim 27 further comprising a conveyor for moving said sheet of textile material by said device.

32. The apparatus of claim 27 wherein said device is mounted to a head assembly positioned above a conveyor wherein said head assembly is movably attached to a gantry bar extending across said conveyor so that said head assembly is movable above and across said conveyor.

33. The apparatus of claim 32 wherein said gantry bar is movably attached to a frame extending at least substantially parallel to said conveyor so that said gantry bar is movable above and along said conveyor in a direction at least substantially parallel thereto.

34. The apparatus of claim 32 wherein said head assembly includes a camera attached thereto such that said camera is movable simultaneously with movement of said head assembly on said gantry bar.

35. An apparatus for correctively guiding a laser beam for cutting on a predetermined cutting path along a sheet of textile material, said apparatus comprising:

(a) a laser for producing a laser beam;

(b) computer means;

(c) conveyor means for moving said sheet of textile material;

(d) guide path input means for inputting into said computer means a guide path comprising predetermined points thereamong matching a predetermined cutting path along said sheet of textile material, said guide path input means comprising template input means for inputting into said computer means for each of said predetermined points of said guide path a template containing an image of the textile material and a search area surrounding said template;

(e) identification means operatively associated with said computer means for identifying, at each of said predetermined points of said guide path, whether said laser beam is on or off of said predetermined cutting path along said sheet of textile material by scanning images of said textile material within each search area and locating a template within each search area matching an inputted template for that search area; and (f) correction means responsive to said computer means for correcting, at each of said predetermined points of said guide path, a position of said laser beam when said laser beam is off of said predetermined cutting path to move said laser beam to follow said predetermined cutting path.

* * * * *